Oct. 7, 1930.  R. P. DUNMIRE  1,777,518
CONDUIT BOX
Filed Feb. 16, 1926
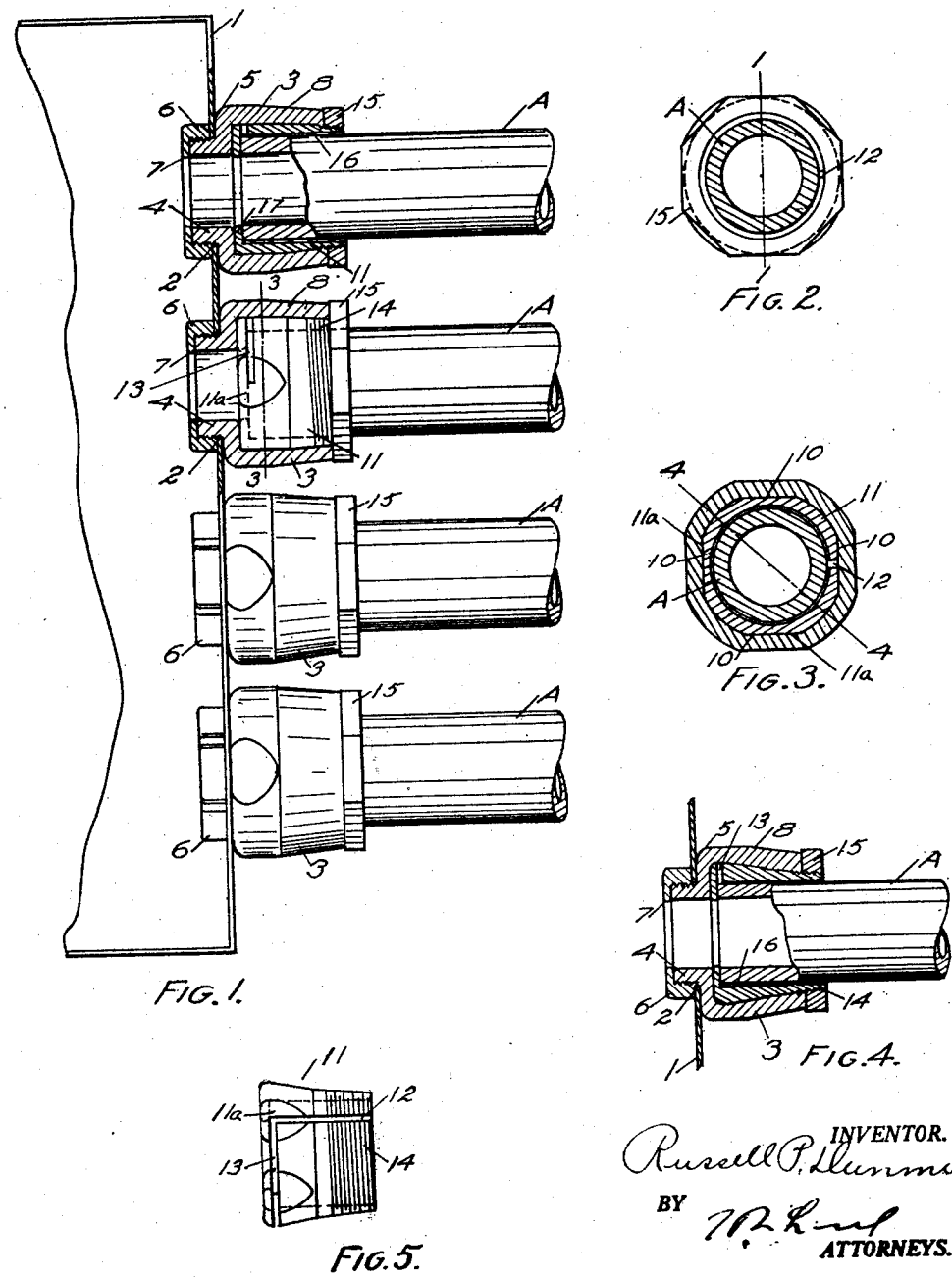

Patented Oct. 7, 1930

1,777,518

UNITED STATES PATENT OFFICE

RUSSELL PAUL DUNMIRE, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT BOX

Application filed February 16, 1926. Serial No. 88,564.

This invention is designed to improve conduit boxes and is of particular advantage with conduit boxes of the knock-out type. In carrying out the invention a conduit securing fitting which is adapted to be connected with the conduit box at the knock-out openings is provided and this fitting cheaply and efficiently provides such connection. Features and details of the invention will appear from the specification and claims.

The invention is illustrated in the accompanying drawings as follows:—

Fig. 1 shows a front view of a box, partly in section.

Fig. 2 an end view of one of the box fittings.

Fig. 3 a section on the line 3—3 in Fig. 1.

Fig. 4 a section on the line 4—4 in Fig. 3.

Fig. 5 a detached view of a contractible clamping sleeve.

1 marks the box. This has the knock-out opening 2 of the usual form in the side wall.

A tubular receiving fitting 3 has a screw-threaded projection 4 extending through the opening 2. The projection extends from a shoulder 5 which abuts against the outer face of the wall of the box 1. A nut 6 screwed on to the projection 4 clamps the wall of the fitting between the shoulder 5 and the nut, thus rigidly securing the fitting to the wall of the box. The nut 6 has the inwardly turned flange with an edge 7 giving a smooth surface over which the conductors may be drawn as they are run into the box.

An extension 8 projects from the shoulder 5. It has its interior surface tapered with the wall converging toward its outer end. The inner surface is provided with a series of flat portions 10.

A contractible sleeve 11 is arranged within the extension 8. It is tapered similarly to the taper of the inner surface of the extension and is provided with flat portions 11ª corresponding to the flat portions 10 so as to lock the contractible sleeve against rotation. The sleeve has the longitudinal slot 12 extending from its outer end to near its inner end and a circumferential slit 13 adjacent to its inner end permitting the sleeve to readily contract. The sleeve has the screw-threaded end 14 projecting beyond the extension 8 and a nut 15 operates on this screw against the end of the extension drawing the sleeve outwardly into wedging engagement with the inner walls of the extension so as to contract it into clamping engagement with an inserted conduit A. The sleeve is provided with the protuberances 16 which are adapted to penetrate the enamel of the conduit so as to assure an electrical connection.

The fitting 3 is preferably formed of malleable iron and initially cast with the extension having non-converging walls. The tapered sleeve is placed in the fitting and the outer end of the fitting is contracted in a press so as to provide the integral annular extension with the outwardly converging inner surfaces.

What I claim as new is:—

1. In a conduit box, the combination of a box wall having a conductor opening; a tubular conduit-receiving fitting having a projection extending through the opening and an outwardly extending shoulder from which the projection extends and an annular integral extension having an inner surface converging outwardly from the box; means on the projection drawing the shoulder into clamping engagement with the outer face of the wall of the box; a contractible sleeve adapted to clamp an inserted conduit in the extension in wedging engagement with the inner surface; and means on the outer end of the sleeve drawing it into wedging engagement to contract the sleeve into clamping engagement with a conduit.

2. In a conduit box, the combination of a box wall having a conductor opening; a tubular conduit-receiving fitting having a projection extending through the opening, an outwardly extending shoulder from which the projection extends, and an annular integral extension having an out of round inner surface converging outwardly from the box; means on the projection drawing the shoulder into clamping engagement with the outer face of the wall of the box; an out of round contractible sleeve adapted to clamp an inserted conduit in the extension in wedging engagement with the inner surface; and means on the outer end of the sleeve drawing it into wedging engagement to contract the sleeve into clamping engagement with a conduit.

3. In a conduit box, the combination of a box wall having a conductor opening; a tubular conduit-receiving fitting having a screw-threaded projection extending through the opening, an outwardly extending shoulder from which the projection extends, and an annular integral extension having an inner surface converging outwardly from the box; a nut on the screw-threaded projection clamping a conduit wall between the nut and the shoulder; a contractible sleeve adapted to clamp an inserted conduit in the extension in wedging engagement with the inner surface; and means on the outer end of the sleeve drawing it into wedging engagement to contract the sleeve into clamping engagement with a conduit.

4. In a conduit box, the combination of a box wall having a conductor opening; a tubular conduit-receiving fitting having a screw-threaded projection extending through the opening, an outwardly extending shoulder from which the projection extends, and an extension having an inner surface converging outwardly from the box; a nut on the screw threaded projection clamping a conduit wall between the nut and the shoulder, said nut having an inturned flange forming a guard for the end of the projection; a contractible sleeve adapted to clamp an inserted conduit in the extension in wedging engagement with the inner surface; and means on the outer end of the sleeve drawing it into wedging engagement to contract the sleeve into clamping engagement with a conduit.

In testimony whereof I have hereunto set my hand.

RUSSELL PAUL DUNMIRE.